US011800386B2

(12) United States Patent
Wu et al.

(10) Patent No.: US 11,800,386 B2
(45) Date of Patent: Oct. 24, 2023

(54) NETWORK QUALITY MONITORING METHOD AND APPARATUS

(71) Applicant: HUAWEI TECHNOLOGIES CO., LTD., Shenzhen (CN)

(72) Inventors: Jun Wu, Nanjing (CN); Dewei Bao, Nanjing (CN); Lv Ding, Nanjing (CN); Zhenhang Sun, Shenzhen (CN); Haonan Ye, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 359 days.

(21) Appl. No.: 17/325,933

(22) Filed: May 20, 2021

(65) Prior Publication Data
US 2021/0274369 A1    Sep. 2, 2021

Related U.S. Application Data

(63) Continuation of application No. PCT/CN2019/117958, filed on Nov. 13, 2019.

(30) Foreign Application Priority Data

Nov. 23, 2018    (CN) .......................... 201811409128.8

(51) Int. Cl.
*H04W 24/08*    (2009.01)
*H04W 84/12*    (2009.01)

(52) U.S. Cl.
CPC ............ *H04W 24/08* (2013.01); *H04W 84/12* (2013.01)

(58) Field of Classification Search
CPC ..... H04W 24/08; H04W 84/12; H04W 24/04; H04W 24/10; H04L 41/5009;
(Continued)

(56) References Cited

U.S. PATENT DOCUMENTS

2002/0044527 A1*    4/2002    Jiang ................... H04W 72/542
                                                            370/349
2005/0163504 A1    7/2005    Bernard et al.
(Continued)

FOREIGN PATENT DOCUMENTS

CN    1677934 A    10/2005
CN    103580905 A    2/2014
(Continued)

OTHER PUBLICATIONS

Chinese Office Action issued in corresponding Chinese Application No. 201811409128.8, dated Feb. 2, 2021, pp. 1-7.
(Continued)

*Primary Examiner* — Afshawn M Towfighi
(74) *Attorney, Agent, or Firm* — HAUPTMAN HAM, LLP

(57) ABSTRACT

This application provides a network quality monitoring method and apparatus. A network quality monitoring apparatus obtains network running data, where the network running data includes dynamic data corresponding to a plurality of sampling periods and static data that are of an AP; determines one channel efficiency value of the AP based on each of a plurality of groups of dynamic data of the AP, so as to obtain a plurality of channel efficiency values of the AP; determines a channel efficiency baseline of the AP based on the static data of the AP; and determines, based on the plurality of channel efficiency values of the AP and the channel efficiency baseline of the AP, network quality of a wireless local area network in which the AP is located.

20 Claims, 6 Drawing Sheets

(58) Field of Classification Search
CPC ..... H04L 43/0888; H04L 43/12; H04L 43/50; H04L 43/08; H04L 43/0876; H04B 17/309
See application file for complete search history.

(56) References Cited

U.S. PATENT DOCUMENTS

| | | | |
|---|---|---|---|
| 2013/0203401 A1* | 8/2013 | Ryan | H04W 24/08 455/422.1 |
| 2014/0105058 A1* | 4/2014 | Hu | H04W 24/08 370/253 |
| 2017/0180088 A1 | 6/2017 | Adachi et al. | |
| 2018/0242169 A1* | 8/2018 | Kowal | H04W 24/02 |

FOREIGN PATENT DOCUMENTS

| | | | |
|---|---|---|---|
| CN | 106376032 A | 2/2017 | |
| CN | 106470461 A | 3/2017 | |
| CN | 107104848 A | 8/2017 | |
| WO | 2007148313 A2 | 12/2007 | |

OTHER PUBLICATIONS

International Search Report issued in corresponding International Application No. PCT/CN2019/117958, dated Jan. 23, 2020, pp. 1-9.
European Search Report issued in corresponding European Application No. 19887754.0, dated Nov. 11, 2021, pp. 1-10, European Patent Office, Munich, Germany.
Japanese Office Action issued in corresponding Japanese Application No. 2021-523628, dated Aug. 2, 2022, pp. 1-5.

* cited by examiner

NETWORK QUALITY MONITORING METHOD AND APPARATUS

CROSS-REFERENCE TO RELATED APPLICATIONS

This application is a continuation of International Application No. PCT/CN2019/117958, filed on Nov. 13, 2019, which claims priority to Chinese Patent Application No. 201811409128.8, filed on Nov. 23, 2018, both of which are hereby incorporated by reference in their entireties.

BACKGROUND

In a wireless local area network, a throughput of an access point (AP) is closely related to network quality. When the throughput of the AP decreases, network quality also deteriorates.

Generally, the network quality is monitored by monitoring the throughput of the AP. Specifically, a throughput model of the AP may be established based on some parameters that affect the throughput of the AP. These parameters that affect the throughput of the AP may include but are not limited to an air interface capacity (for example, a frequency band, a bandwidth, or the like affects the air interface capacity), a device capacity (for example, a communications protocol, a multiple-input multiple-output MIMO mode, or the like affects the device capacity), coverage of the AP (for example, the coverage of the AP is reflected by a received signal strength and the like), and an interference factor (for example, a co-channel interference rate between APs). Inputs of the throughput model of the AP are the foregoing parameters, and an output is the throughput of the AP (namely, a throughput threshold of the AP). In actual application, a network quality monitoring apparatus may obtain an actual throughput of the AP and the foregoing parameters in a wireless network, and then determine network quality with reference to the throughput threshold of the AP that is output by the throughput model of the AP. If the actual throughput of the AP is less than the throughput threshold of the AP, it is considered that the network quality is poor.

However, a network quality change caused by the foregoing parameters that affect the throughput of the AP is determined based on the foregoing throughput model of the AP, and a network quality change caused by another factor cannot be monitored. Therefore, an effect of network quality detection may be not obvious.

SUMMARY

Embodiments of this application provide a network quality monitoring method and apparatus, and a system, to more effectively monitor network quality.

To achieve the foregoing objective, the following technical solutions are used in the embodiments of this application.

According to a first aspect, an embodiment of this application provides a network quality monitoring method, including: A network quality monitoring apparatus obtains network running data. The network running data includes static data and dynamic data that are of an access point AP, and the dynamic data includes a plurality of groups of dynamic data corresponding to a plurality of sampling periods. The network quality monitoring apparatus determines one channel efficiency value of the AP based on each of the plurality of groups of dynamic data of the AP, so as to obtain a plurality of channel efficiency values of the AP. One channel efficiency value of the AP is a volume of data transmitted per unit time in a valid data transmission time period in one sampling period. The network quality monitoring apparatus determines a channel efficiency baseline of the AP based on the static data of the AP. The channel efficiency baseline of the AP is used to indicate a variation relationship between a reference value of a channel efficiency value of the AP and a first dynamic parameter, and the first dynamic parameter is one of the dynamic data. The network quality monitoring apparatus determines, based on the plurality of channel efficiency values of the AP and the channel efficiency baseline of the AP, network quality of a wireless local area network in which the AP is located.

According to the network quality monitoring method provided in this embodiment of this application, the network quality monitoring apparatus may separately determine the plurality of channel efficiency values of the AP and the channel efficiency baseline of the AP based on the network running data (including the static data and the plurality of groups of dynamic data that are of the AP) obtained by the network quality monitoring apparatus, and determines, based on the plurality of channel efficiency values of the AP and the channel efficiency baseline of the AP, network quality of the wireless local area network in which the AP is located. In addition, the channel efficiency value of the AP may truly reflect a network quality change caused by various factors to some extent. Therefore, the network quality monitoring method provided in this application more effectively monitors network quality.

In a possible implementation, the valid data transmission time period in the one sampling period may be a consecutive time period in the one sampling period, or the valid data transmission time period may be a time period formed by several inconsecutive time periods in the one sampling period. This is not specifically limited in this embodiment of this application.

In a possible implementation, the dynamic data includes a throughput of the AP, a channel usage of the AP, and a co-channel interference rate of the AP.

In a possible implementation, the static data includes a type of the AP, a network frequency band, and bandwidth.

In this embodiment of this application, a data collection device in a network may collect network running data. The network running data may be classified into a log, a key performance indicator (KPI), alarm data, configuration data, and the like. The network quality monitoring apparatus may obtain, from the data collection device, network running data, collected by the data collection device in a preset time period (which may also be referred to as a sampling time, and the sampling time includes a plurality of sampling periods), for example, a KPI and configuration data, where the KPI includes dynamic data (data that changes with time). A group of dynamic data may be obtained in each sampling period of the preset time period, and the configuration data includes static data (data does not change with time).

In a possible implementation, a method for determining, by the network quality monitoring apparatus, one channel efficiency value of the AP based on one group of dynamic data of the AP may include: The network quality monitoring apparatus determines the channel efficiency value of the AP by using a formula $AP\_cp = AP\_tp/(AP\_cu - AP\_cf)$, where $AP\_cp$ is the channel efficiency value of the AP, $AP\_tp$ represents the throughput of the AP, $AP\_cu$ represents the channel usage of the AP, and $AP\_cf$ represents the co-channel interference rate of the AP.

In this embodiment of this application, in one sampling period, the channel efficiency value is defined as:

$$AP\_cp = (tx\_bytes + rx\_bytes)/(tx\_frame + rx\_frame)$$

$$= \frac{tx\_bytes + rx\_bytes}{pcu\_cycle} \Big/ \frac{tx\_frame + rx\_frame}{pcu\_cycle}$$

$$= \frac{tx\_bytes + rx\_bytes}{pcu\_cycle} \Big/ \frac{rx\_busy - rx\_inf}{pcu\_cycle}$$

where tx_bytes is a quantity of bytes sent by the AP in the sampling period, rx_bytes is a quantity of bytes received by the AP in the sampling period, tx_frame is a time occupied by the AP to send data, rx_frame is a time occupied by the AP to receive data, pcu_cycle is the sampling period, rx_busy is a channel busy time, and rx_inf is a channel interference time. Because $$\frac{tx\_bytes - rx\_bytes}{pcu\_cycle} = AP\_tp$$

and $$\frac{tx\_bytes - rx\_inf}{pcu\_cycle} = AP\_cu - AP\_cf,$$

it may obtain AP_cp=AP_tp/(AP_cu−AP_cf).

In a possible implementation, the method for determining a channel efficiency baseline of the AP includes: The network quality monitoring apparatus determines a channel efficiency baseline corresponding to the type of the AP, the network frequency band, and the bandwidth in a preconfigured channel efficiency baseline library as the channel efficiency baseline of the AP.

In this embodiment of this application, in an ideal test environment, for example, in an environment in which a factor (for example, a frequency band, bandwidth, received signal strength, or an interference rate) that affects the throughput of the AP is in a critical state, a group of static data remains unchanged, a plurality of values of the channel efficiency value corresponding to a plurality of values of the first dynamic parameter (for example, a plurality of values of the channel usage) are obtained through testing (the channel efficiency values obtained in this test environment are referred to as reference values of the channel efficiency value, or referred to as thresholds of the channel efficiency value). Therefore, a curve formed by the plurality of values of the first dynamic parameter and the plurality of reference values corresponding to the channel efficiency value is used as a determining criterion for determining network quality, and is referred to as the channel efficiency baseline.

Specifically, different static data is corresponding to different channel efficiency baselines, and a plurality of channel efficiency baselines may form a channel efficiency baseline library. In this embodiment of this application, the channel efficiency baseline may be obtained based on test data under the different static data (the test data includes a plurality of different first dynamic parameters and reference values, of channel efficiency values, corresponding to the first dynamic parameters). In addition, the channel efficiency baseline library may be preconfigured on the network quality monitoring apparatus. The channel efficiency baseline library includes a plurality of channel efficiency baselines corresponding to the plurality of groups of static data of the AP, and one group of given type of the AP, network frequency band, and bandwidth is corresponding to one channel efficiency baseline. One first dynamic parameter may be corresponding to one channel efficiency value on the channel efficiency baseline, and the channel efficiency value on the channel efficiency baseline may be used as a reference value of the channel efficiency value of the AP (which may also be referred to as a threshold of the channel efficiency value of the AP). In other words, one channel efficiency baseline may reflect a change trend of the channel efficiency value of the AP with the first dynamic parameter.

In a possible implementation, the channel efficiency baseline of the AP may be a curve of a variation relationship between the reference value of the channel efficiency value of the AP and the throughput of the AP, or a curve of a variation relationship between the reference value of the channel efficiency value of the AP and the channel usage of the AP, or is a curve of a variation relationship between the reference value of the channel efficiency value of the AP and the co-channel interference rate of the AP. In addition, under one group of static data, with reference to a data statistics feature, variation relationships between the channel efficiency value of the AP and the foregoing three dynamic parameters are similar. In other words, channel efficiency baselines corresponding to the three different dynamic parameters are similar.

In a possible implementation, the first dynamic parameter is the channel usage.

In a possible implementation, when the first dynamic parameter is the channel usage, that the network quality monitoring apparatus determines, based on the plurality of channel efficiency values of the AP and the channel efficiency baseline of the AP, network quality of a wireless local area network in which the AP is located includes: If a ratio of a total quantity of channel efficiency values that are in the plurality of channel efficiency values of the AP and that are less than a channel efficiency value corresponding to the channel efficiency baseline to a total quantity of channel efficiency values of the AP is greater than or equal to a preset ratio, the network quality monitoring apparatus determines that network quality of the wireless local area network in which the AP is located is poor; or if a ratio of a quantity of channel efficiency values that are in the plurality of channel efficiency values of the AP and that are less than a channel efficiency value corresponding to the channel efficiency baseline to a quantity of channel efficiency values of the AP is less than a preset ratio, the network quality monitoring apparatus determines that network quality of the wireless local area network in which the AP is located is normal.

In this embodiment of this application, if a channel efficiency value in the plurality of channel efficiency values of the AP is less than a channel efficiency value corresponding to the channel efficiency baseline, it indicates that an amount of data transmitted per unit time in a valid data transmission time period is relatively small under a corresponding channel usage; or if a channel efficiency value in the plurality of channel efficiency values of the AP is greater than a channel efficiency value corresponding to the channel efficiency baseline, it indicates that an amount of data transmitted per unit time in a valid data transmission time period is relatively large under a corresponding channel usage. Therefore, if a ratio of a quantity of channel efficiency values that are in the plurality of channel efficiency values of the AP and that are less than a channel efficiency value corresponding to the channel efficiency baseline is greater than or equal to a preset ratio, it indicates that a data transmission effect is relatively poor, and the network quality monitoring apparatus determines that network quality of the wireless local area network in which the AP is located is poor. If a ratio of a quantity of channel efficiency values that are in the plurality of channel efficiency values of the AP and that are less than a channel efficiency value corresponding to the channel efficiency baseline is less than a preset ratio, it indicates that a data transmission effect is relatively good, and the network quality monitoring apparatus determines that network quality of the wireless local area network in which the AP is located is normal.

In a possible implementation, when the first dynamic parameter is the channel usage, that the network quality monitoring apparatus determines, based on the plurality of channel efficiency values of the AP and the channel efficiency baseline of the AP, network quality of a wireless local area network in which the AP is located includes: If a quantity of channel efficiency values that are in the plurality of channel efficiency values of the AP and that are consecutively less than a channel efficiency value corresponding to the channel efficiency baseline is greater than or equal to a preset quantity, the network quality monitoring apparatus determines that network quality of the wireless local area network in which the AP is located is poor; or if a quantity of channel efficiency values that are in the plurality of channel efficiency values of the AP and that are consecutively less than a channel efficiency value corresponding to the channel efficiency baseline is less than a preset quantity, the network quality monitoring apparatus determines that network quality of the wireless local area network in which the AP is located is normal.

In this embodiment of this application, if a quantity of channel efficiency values that are consecutively less than a channel efficiency value corresponding to the channel efficiency baseline is greater than or equal to a preset quantity, it indicates that a data transmission effect is relatively poor, and the network quality monitoring apparatus determines that network quality of the wireless local area network in which the AP is located is poor. If a quantity of channel efficiency values that is in the plurality of channel efficiency values of the AP and that are consecutively less than a channel efficiency value corresponding to the channel efficiency baseline is less than a preset quantity, it indicates that a data transmission effect is relatively good, and the network quality monitoring apparatus determines that network quality of the wireless local area network in which the AP is located is normal.

In a possible implementation, when the first dynamic parameter is the channel usage, that the network quality monitoring apparatus determines, based on the plurality of channel efficiency values of the AP and the channel efficiency baseline of the AP, network quality of a wireless local area network in which the AP is located includes: If a ratio of a first distance to a quantity of channel efficiency values of the AP is greater than a preset ratio, the network quality monitoring apparatus determines that network quality of the wireless local area network in which the AP is located is poor, where the first distance is a sum of distances between a channel efficiency value corresponding to the channel efficiency baseline and channel efficiency values that are in the plurality of channel efficiency values of the AP and that are less than the channel efficiency value corresponding to the channel efficiency baseline; or if a ratio of a first distance to a quantity of channel efficiency values of the AP is less than or equal to a preset ratio, the network quality monitoring apparatus determines that network quality of the wireless local area network in which the AP is located is normal.

In this embodiment of this application, the ratio of the first distance to the quantity of channel efficiency values of the AP may reflect a degree to which the channel efficiency value of the AP is less than a channel efficiency value corresponding to the channel efficiency baseline. If the ratio of the first distance to the quantity of channel efficiency values of the AP is greater than the preset ratio, it indicates that a data transmission effect is relatively poor, and the network quality monitoring apparatus determines that network quality of the wireless local area network in which the AP is located is poor. If the ratio of the first distance to the quantity of channel efficiency values of the AP is less than or equal to the preset ratio, it indicates that a data transmission effect is relatively good, and the network quality monitoring apparatus determines that network quality of the wireless local area network in which the AP is located is normal.

According to a second aspect, this application provides a network quality monitoring apparatus. The network quality monitoring apparatus includes an obtaining module, a first determining module, and a second determining module. The obtaining module is configured to obtain network running data. The network running data includes static data and dynamic data that are of an access point AP, and the dynamic data includes a plurality of groups of dynamic data corresponding to a plurality of sampling periods. The first determining module is configured to determine one channel efficiency value of the AP based on each of the plurality of groups of dynamic data of the AP, obtained by the obtaining module, so as to obtain a plurality of channel efficiency values of the AP; and determine a channel efficiency baseline of the AP based on the static data, of the AP, obtained by the obtaining module. One channel efficiency value of the AP is a volume of data transmitted per unit time in a valid data transmission time period in one sampling period. The channel efficiency baseline of the AP is used to indicate a variation relationship between a reference value of a channel efficiency value of the AP and a first dynamic parameter, and the first dynamic parameter is one of the dynamic data. The second determining module is configured to determine, based on the plurality of channel efficiency values of the AP and the channel efficiency baseline of the AP, network quality of a wireless local area network in which the AP is located.

In a possible implementation, the dynamic data includes a throughput of the AP, a channel usage of the AP, and a co-channel interference rate of the AP.

In a possible implementation, the static data includes a type of the AP, a network frequency band, and bandwidth.

In a possible implementation, the first determining module is specifically configured to determine the channel efficiency value of the AP by using a formula AP_cp=AP_tp/(AP_cu−AP_cf), where AP_cp is the channel efficiency value of the AP, AP_tp represents the throughput of the AP, AP_cu represents the channel usage of the AP, and AP_cf represents the co-channel interference rate of the AP.

In a possible implementation, the first determining module is specifically configured to determine a channel efficiency baseline corresponding to the type of the AP, the network frequency band, and the bandwidth in a preconfigured channel efficiency baseline library as the channel efficiency baseline of the AP.

In a possible implementation, the first dynamic parameter is the channel usage.

In a possible implementation, when the first dynamic parameter is the channel usage, the second determining module is specifically configured to: if a ratio of a quantity of channel efficiency values that are in the plurality of channel efficiency values of the AP and that are less than a channel efficiency value corresponding to the channel efficiency baseline to a total quantity of channel efficiency values of the AP is greater than or equal to a preset ratio, determine that network quality of the wireless local area network in which the AP is located is poor; or if a ratio of a quantity of channel efficiency values that are in the plurality of channel efficiency values of the AP and that are less than a channel efficiency value corresponding to the channel efficiency baseline to a quantity of channel efficiency values of the AP is less than a preset ratio, determine that network quality of the wireless local area network in which the AP is located is normal.

In a possible implementation, when the first dynamic parameter is the channel usage, the second determining module is specifically configured to: if a quantity of channel efficiency values that are in the plurality of channel efficiency values of the AP and that are consecutively less than a channel efficiency value corresponding to the channel efficiency baseline is greater than or equal to a preset quantity, determine that network quality of the wireless local area network in which the AP is located is poor; or if a quantity of channel efficiency values that are in the plurality of channel efficiency values of the AP and that are consecutively less than a channel efficiency value corresponding to the channel efficiency baseline is less than a preset quantity, determine that network quality of the wireless local area network in which the AP is located is normal.

In a possible implementation, when the first dynamic parameter is the channel usage, the second determining module is specifically configured to: if a ratio of a first distance to a quantity of channel efficiency values of the AP is greater than a preset ratio, determine that network quality of the wireless local area network in which the AP is located is poor; or if a ratio of a first distance to a quantity of channel efficiency values of the AP is less than or equal to a preset ratio, determine that network quality of the wireless local area network in which the AP is located is normal, where the first distance is a sum of distances between a channel efficiency value corresponding to the channel efficiency baseline and channel efficiency values that are in the plurality of channel efficiency values of the AP and that are less than the channel efficiency value corresponding to the channel efficiency baseline.

According to a third aspect, an embodiment of this application provides a network quality monitoring apparatus. The network quality monitoring apparatus includes a processor and a memory coupled to the processor. The memory is configured to store a computer program. The processor is configured to invoke the computer program. When the computer program is executed, the processor performs the network quality monitoring method according to any one of the first aspect and the possible implementations of the first aspect.

According to a fourth aspect, an embodiment of this application provides a computer-readable storage medium. The computer-readable storage medium may include a computer instruction. When the computer instruction is run on a computer, a network quality monitoring apparatus is enabled to perform the network quality monitoring method according to any one of the first aspect and the possible implementations of the first aspect.

According to a fifth aspect, an embodiment of this application provides a computer program product including a computer instruction. When the computer program product runs on a computer, a network quality monitoring apparatus is enabled to perform the network quality monitoring method according to any one of the first aspect and the possible implementations of the first aspect.

It may be understood that the network quality monitoring apparatus according to the second aspect, the network quality monitoring apparatus according to the third aspect, the computer storage medium according to the fifth aspect, and the computer program product according to the sixth aspect are configured to perform the corresponding method provided in the foregoing description. Therefore, for beneficial effects that can be achieved, refer to the beneficial effects in the corresponding method provided in the foregoing description. Details are not described herein again.

DESCRIPTION OF EMBODIMENTS

Figure 1:
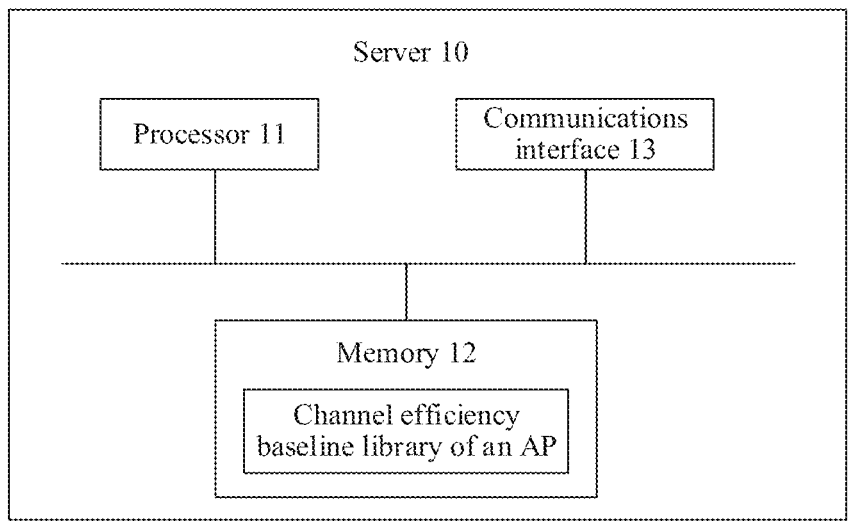
FIG. 1 is a schematic diagram of hardware of a server according to an embodiment of this application.

The term "and/or" in this specification describes only an association relationship for describing associated objects and represents that three relationships may exist. For example, A and/or B may represent the following three cases: Only A exists, both A and B exist, and only B exists.

In addition, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example", "for example" or the like is intended to present a relative concept in a specific manner.

In the description of the embodiments of this application, unless otherwise stated, "a plurality of" means two or more than two. For example, a plurality of processing units are two or more processing units. A plurality of systems are two or more systems.

First, some concepts related to a network quality monitoring method and apparatus provided in the embodiments of this application are described.

Throughput: A throughput indicates an amount of data successfully transmitted per unit time by a communication device. In a wireless local network, a throughput of an AP reflects, to some extent, network quality of the wireless local network in which the AP is located. Generally, after receiving a fault reported by a user, an operation and maintenance personnel runs test software on site to test whether the throughput of the AP reaches a threshold of the throughput. If the throughput of the AP is less than the threshold of the throughput, network quality is poor.

In this embodiment of this application, common factors that affect network quality include a frequency band and a bandwidth that are supported by the AP, a communications protocol supported by the AP, an input/output mode of the AP, and the like. The foregoing factors reduce the throughput of the AP in the wireless local area network, so that network quality deteriorates. Specifically, when the frequency band and the bandwidth supported by the AP are relatively small, the throughput of the AP is relatively low. When the communication protocol supported by the AP differs, the throughput of the AP also varies. If the input and output mode (such as a MIMO mode) of the AP differs, the throughput of the AP is affected.

In addition, factors that affect network quality further include a user side factor and an air interface side factor. The following Table 1 shows various factors and causes of poor network quality.

TABLE 1

| Factors affecting network quality | | Cause analysis |
|---|---|---|
| User side factor | Weak terminal | A capability of a terminal is weak, a transmission rate is low, and a channel occupation time is long, so that a throughput of an AP decreases. |
| | Sticky terminal | For example, a terminal that does not support AP switching, and when an AP of the terminal changes, received signal strength is low, so that a throughput of an AP decreases. |
| Air interface side factor | Wi-Fi interference | Namely, co-channel interference, and a channel time of an AP is occupied, so that a throughput of an AP decreases. |
| | Non-Wi-Fi interference | For example, Bluetooth or electromagnetic interference, and a channel time of an AP is occupied, so that a throughput of an AP decreases. |
| | Weak signal | When coverage of an AP is poor, received signal strength is low, so that a throughput of an AP decreases. |
| | Excessively quantity of users | When a quantity of terminals served by an AP is relatively large, channel competition is intensified, so that a collision rate increases and a throughput of an AP decreases. |
| | Hidden node | A hidden node may cause a conflict when an AP receives or sends data, so that a throughput of an AP decreases. |

Channel efficiency: Channel efficiency is used to measure a data transmission effect, and channel efficiency of an AP may be measured by using a channel efficiency value. Specifically, the channel efficiency value of the AP refers to an amount of data transmitted per unit time in a time period in which the AP transmits data in one sampling period (namely, a time period in which the AP actually transmits data, which is referred to as a valid data transmission time period in the following). For example, if the sampling period is one minute, and the effective data transmission time period is 40 seconds, an amount of data transmitted per second within the 40 seconds is the channel efficiency value of the AP. In this embodiment of this application, the channel efficiency value of the AP may also reflect network quality of the wireless local area network.

Based on a problem existing in the background, the embodiments of this application provide a network quality monitoring method and apparatus. The network quality monitoring apparatus may obtain network running data, where the network running data specifically includes a plurality of groups of dynamic data corresponding to a plurality of sampling periods and static data that are of an AP; determine one channel efficiency value of the AP based on each of the plurality of groups of dynamic data of the AP, so as to obtain a plurality of channel efficiency values of the AP; determine a channel efficiency baseline of the AP based on the static data of the AP; and determine, based on the plurality of channel efficiency values of the AP and the channel efficiency baseline of the AP, network quality of a wireless local area network in which the AP is located, so that network quality is monitored more effectively.

The network quality monitoring apparatus provided in the embodiments of this application may also be an analyzer, and is mainly configured to analyze the network running data to obtain the channel efficiency value of the AP, to analyze whether network quality is abnormal. The analyzer may be a server, and the following specifically describes components of the server provided in the embodiments of this application with reference to FIG. 1. As shown in FIG. 1, the server 10 may include a processor 11, a memory 12, a communications interface 13, and the like.

The processor 11 is a core component of the server 10, and is configured to run an operating system of the server 10 and an application program (including a system application program and a third-party application program) on the server 30. For example, the processor 11 monitors network quality by running a network quality monitoring method program on the server.

In the embodiments of this application, the processor 11 may be specifically a central processing unit (CPU), a general purpose processor, a digital signal processor (DSP), an application-specific integrated circuit (ASIC), a field programmable gate array (FPGA), another programmable logic device, a transistor logic device, a hardware component, or any combination thereof. The transistor logic device may implement or execute various example logic blocks, modules, and circuits described with reference to content disclosed in the embodiments of this application. Alternatively, the processor may be a combination of processors implementing a computing function, for example, a combination of one or more microprocessors, or a combination of a DSP and a microprocessor.

The memory 12 may be configured to store a software program and a module. The processor 11 executes various functional applications of the server 10 and data processing by running the software program and the module stored in the memory 12. The memory 12 may include one or more computer-readable storage media. The memory 12 includes a program storage area and a data storage area. The program storage area may store an operating system, an application program for use by at least one function, and the like. The data storage area may store data created by the server 10, and the like. In this embodiment of this application, the memory 12 may include a program used for network monitoring, network running data, and a channel efficiency value and a channel efficiency baseline library that are of an AP and that are obtained based on the network running data.

In this embodiment of this application, the memory 12 may specifically include a volatile memory, for example, a random access memory (RAM); or may include a non-volatile memory, for example, a read-only memory (ROM), a flash memory, a hard disk drive (HDD), or a solid-state drive (SSD); or may include a combination of the foregoing types of memories.

The communications interface 13 is an interface circuit used for communication between the server 10 and another device. The communications interface may be a structure having a transceiver function, such as a transceiver or a transceiver circuit. In this embodiment of this application, the communications interface 13 on the server 10 may be used to receive network running data collected by a data collection device, and the like.

Figure 2:
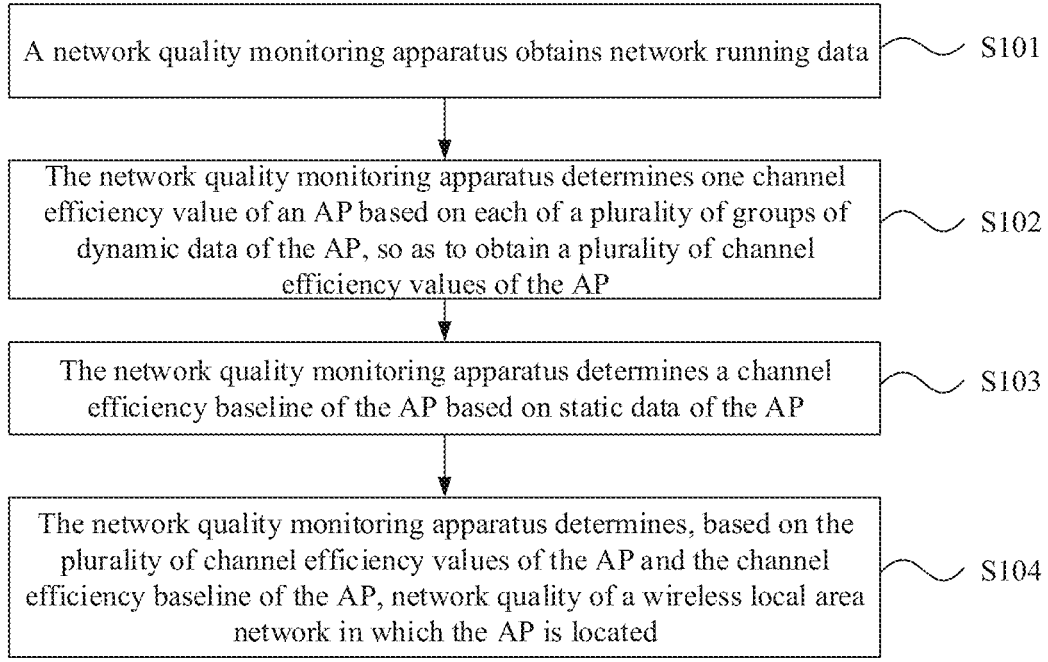
FIG. 2 is a schematic diagram 1 of a network quality monitoring method according to an embodiment of this application.

As shown in FIG. 2, a network quality monitoring method provided in this embodiment of this application may include S101 to S104.

S101: A network quality monitoring apparatus obtains network running data.

The network running data includes static data and dynamic data that are of an AP, and the dynamic data includes a plurality of groups of dynamic data corresponding to a plurality of sampling periods.

In this embodiment of this application, a data collection device in a network may collect the network running data. The network running data may be classified into a log, a key performance indicator (KPI), alarm data, configuration data, and the like. The network quality monitoring apparatus may obtain, from the data collection device, network running data, collected by the data collection device in a preset time period (which may also be referred to as a sampling time, and the sampling time includes a plurality of sampling periods), for example, a KPI and configuration data, where the KPI includes dynamic data, and the configuration data includes static data.

In this embodiment of this application, one group of dynamic data may be obtained in each sampling period of the preset time period, and each group of dynamic data includes a throughput of the AP, a channel usage of the AP, and a co-channel interference rate of the AP. It may be understood that the dynamic data is time series data (namely, data that changes with time).

In the foregoing preset time period, the obtained static data includes a type of the AP, a network frequency band, and bandwidth. The static data does not change with time. The type of the AP may be AP 7000, AP 6000, or the like. The network frequency band may be 2.4 GHz (namely, gigahertz, and GHz is 1 billion hertz), 5 GHz, or the like. The network bandwidth may be 20 MHz (namely, megahertz), 40 MHz, or the like.

For example, the following Table 2 shows several groups of examples of the static data of the AP.

TABLE 2

| Type of an AP | Network frequency band | Bandwidth |
|---|---|---|
| AP 7000 | 5 GHZ | 20 MHz |
| AP 6000 | 5 GHZ | 40 MHz |
| AP 2000 | 2.4 GHZ | 20 MHz |

S102: The network quality monitoring apparatus determines one channel efficiency value of the AP based on each of the plurality of groups of dynamic data of the AP, so as to obtain a plurality of channel efficiency values of the AP.

One channel efficiency value of the AP is a volume of data transmitted per unit time in a valid data transmission time period in one sampling period.

Optionally, in this embodiment of this application, the valid data transmission time period in the one sampling period may be a consecutive time period in the one sampling period, or the valid data transmission time period may be a time period formed by several inconsecutive time periods in the one sampling period. This is not specifically limited in this embodiment of this application.

In this embodiment of this application, in one sampling period, the channel efficiency value is defined as:

$$AP\_cp = (tx\_bytes + rx\_bytes)/(tx\_frame + rx\_frame) \quad (1)$$

$$= \frac{tx\_bytes + rx\_bytes}{pcu\_cycle} \Big/ \frac{tx\_frame + rx\_frame}{pcu\_cycle}$$

$$= \frac{tx\_bytes + rx\_bytes}{pcu\_cycle} \Big/ \frac{rx\_busy - rx\_inf}{pcu\_cycle}$$

where tx_bytes is a quantity of bytes sent by the AP in the sampling period, rx_bytes is a quantity of bytes received by the AP in the sampling period, tx_frame is a time occupied by the AP to send data, rx_frame is a time occupied by the AP to receive data, pcu_cycle is the sampling period, rx_busy is a channel busy time, and rx_inf is a channel interference time.

In the formula (1), $$\frac{tx\_bytes - rx\_bytes}{pcu\_cycle} = AP\_tp,$$

and AP_tp represents the throughput of the AP; and $$\frac{tx\_bytes - rx\_inf}{pcu\_cycle} = AP\_cu - AP\_cf,$$

AP_cu represents the channel usage of the AP, and AP_cf represents the co-channel interference rate of the AP.

In summary, the channel efficiency value of the AP is:

$$AP\_cp = AP\_tp/(AP\_cu - AP\_cf) \quad (2)$$

AP_cp is the channel efficiency value of the AP, AP_tp represents the throughput of the AP, AP_cu represents the channel usage of the AP, and AP_cf represents the co-channel interference rate of the AP.

The following uses an example to describe how to calculate the channel efficiency value of the AP. It is assumed that a sampling period is 30 seconds (s), a throughput of the AP in the sampling period is 200 Mbit/s (Mbps), a channel usage of the AP is 20%, and a co-channel interference rate of the AP is 0. A channel efficiency value 1000 Mbps of the AP is obtained according to the formula (2). In the sampling period, a valid data transmission time period is 6 s (that is, 30 s×20%). That the channel efficiency value of the AP is 1000 Mbps may be understood as: in this 6 s, an average amount of data transmitted by the AP per second is 1000 Mbit/s (Mb).

In this embodiment of this application, for a throughput of an AP, a channel usage of an AP, and a co-channel interference rate of an AP in each group of dynamic data of the AP, one channel efficiency value of the AP may be determined according to the formula (2). In this way, the plurality of channel efficiency values of the AP may be obtained based on the plurality of groups of dynamic data of the AP.

S103: The network quality monitoring apparatus determines a channel efficiency baseline of the AP based on the static data of the AP.

The channel efficiency baseline is used to indicate a variation relationship between a reference value of a channel efficiency value of the AP and a first dynamic parameter, and the first dynamic parameter is one of the foregoing dynamic data of the AP. Specifically, the channel efficiency baseline of the AP may be a curve formed by a plurality of values of the first dynamic parameter and a plurality of reference values of the corresponding channel efficiency values.

In this embodiment of this application, in an ideal test environment, for example, in an environment in which a factor (for example, a frequency band, bandwidth, received signal strength, or an interference rate) that affects the throughput of the AP is in a critical state, a group of static data remains unchanged, a plurality of values of the channel efficiency value corresponding to a plurality of values of the first dynamic parameter (for example, a plurality of values of the channel usage) are obtained through testing (the channel efficiency values obtained in this test environment are referred to as reference values of the channel efficiency value, or referred to as thresholds of the channel efficiency value). Therefore, a curve formed by the plurality of values of the first dynamic parameter and the plurality of reference values corresponding to the channel efficiency value is used as a determining criterion for determining network quality, and is referred to as the channel efficiency baseline.

Specifically, different static data is corresponding to different channel efficiency baselines, and a plurality of channel efficiency baselines may form a channel efficiency baseline library. In this embodiment of this application, the channel efficiency baseline may be obtained based on test data under the different static data (the test data includes a plurality of different first dynamic parameters and reference values, of channel efficiency values, corresponding to the first dynamic parameters). For example, that the first dynamic parameter is the channel usage of the AP, and the static data includes three groups of static data in Table 2 is used as an example. In a test environment under a first group of static data, a plurality of different channel usages and reference values, of channel efficiency values of APs, corresponding to the plurality of different channel usages may be obtained, and therefore a channel efficiency baseline corresponding to the first group of static data is obtained. In a test environment under a second group of static data, a plurality of different channel usages and reference values, of channel efficiency values of APs, corresponding to the plurality of different channel usages may be obtained, to obtain a channel efficiency baseline corresponding to the second group of static data, and by analogy, a channel efficiency baseline corresponding to a third group of static data is obtained, so that a channel efficiency baseline library of the AP is formed.

Optionally, in this embodiment of this application, the foregoing channel efficiency baseline may further be obtained through learning by using a learning algorithm based on historical data in a network running process (the historical data includes different static data, and a plurality of different first dynamic parameters and reference values, of channel efficiency values, corresponding to the plurality different first dynamic parameters under the different static data). It should be noted that a method for obtaining the channel efficiency baseline of the AP based on the foregoing historical data is similar to the method for obtaining the channel efficiency baseline of the AP based on the foregoing test data. Details are not described herein again.

In this embodiment of this application, the channel efficiency baseline library may be preconfigured on the network quality monitoring apparatus. The channel efficiency baseline library includes a plurality of channel efficiency baselines corresponding to the plurality of groups of static data of the AP, and one group of given type of the AP, network frequency band, and bandwidth is corresponding to one channel efficiency baseline. One first dynamic parameter may be corresponding to one channel efficiency value on the channel efficiency baseline, and the channel efficiency value on the channel efficiency baseline may be used as a reference value of the channel efficiency value of the AP (which may also be referred to as a threshold of the channel efficiency value of the AP). In other words, one channel efficiency baseline may reflect a change trend of the channel efficiency value of the AP with the first dynamic parameter.

Optionally, in this embodiment of this application, the channel efficiency baseline of the AP may be a curve of a variation relationship between the reference value of the channel efficiency value of the AP and the throughput of the AP, or a curve of a variation relationship between the reference value of the channel efficiency value of the AP and the channel usage of the AP, or is a curve of a variation relationship between the reference value of the channel efficiency value of the AP and the co-channel interference rate of the AP.

It may be understood that, under one group of static data, with reference to a data statistics feature, variation relationships between the reference value of the channel efficiency value of the AP and the foregoing three dynamic parameters are similar. In other words, channel efficiency baselines corresponding to the three different dynamic parameters are similar.

Figure 3:
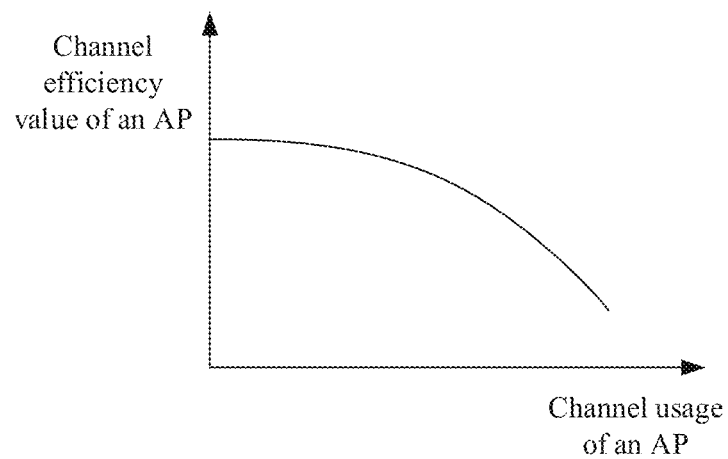
FIG. 3 is a schematic diagram 1 of a channel efficiency baseline of an AP according to an embodiment of this application.

In this embodiment of this application, if the first dynamic parameter is the channel usage of the AP, for example, it is assumed that the type of the AP is AP 7000, the network frequency band is 5 GHz, and the bandwidth is 20 MHz, FIG. 3 is a schematic diagram of a channel efficiency baseline of the AP based on the group of static data.

S104: The network quality monitoring apparatus determines, based on the plurality of channel efficiency values of the AP and the channel efficiency baseline of the AP, network quality of a wireless local area network in which the AP is located.

In this embodiment of this application, the network quality monitoring apparatus may determine, based on a distribution relationship between the plurality of channel efficiency values of the AP and the channel efficiency baseline of the AP, network quality of the wireless local area network in which the AP is located.

According to the network quality monitoring method provided in this embodiment of this application, the network quality monitoring apparatus may separately determine the plurality of channel efficiency values of the AP and the channel efficiency baseline of the AP based on the network running data (including the static data and the plurality of groups of dynamic data that are of the AP) obtained by the network quality monitoring apparatus, and determines, based on the plurality of channel efficiency values of the AP and the channel efficiency baseline of the AP, network quality of the wireless local area network in which the AP is located. The channel efficiency value of the AP may truly reflect a network quality change caused by various factors to some extent. Therefore, the network quality monitoring method provided in this application more effectively monitors network quality.

Figure 4:
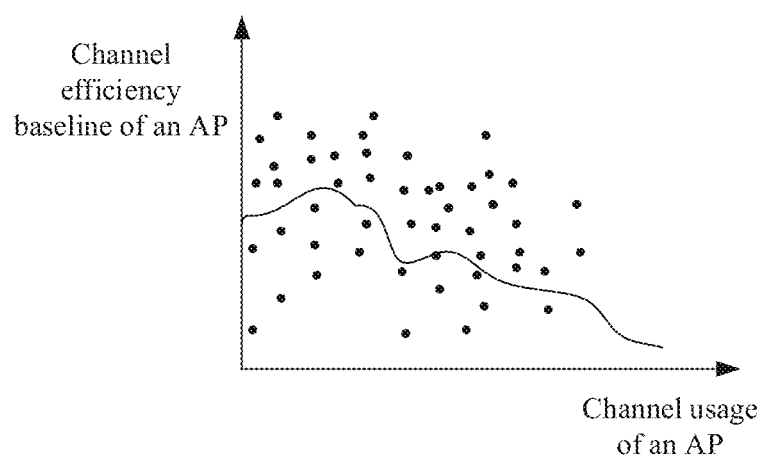
FIG. 4 is a schematic diagram 2 of a channel efficiency baseline of an AP according to an embodiment of this application.

Optionally, in this embodiment of this application, if the first dynamic parameter is the channel usage of the AP, the network quality monitoring apparatus obtains a plurality of groups of dynamic data, and each group of dynamic data includes one channel usage. In this way, the network quality monitoring apparatus obtains a plurality of channel usages, and the plurality of channel usages are respectively corresponding to a plurality of channel efficiency values. Further, a 2-tuple including each channel usage of the AP and each corresponding channel efficiency value of the AP is embodied in a coordinate distribution diagram of the channel efficiency value and the channel usage that are of the AP. For example, in a coordinate distribution diagram shown in FIG. 4, a horizontal coordinate is a channel usage of an AP, and a vertical coordinate is a channel efficiency value of an AP. A curve 11 is a channel efficiency baseline, of the AP, corresponding to static data of the AP. It is assumed that the network quality monitoring apparatus obtains 50 groups of dynamic data, that is, obtains 50 channel usages, which are corresponding to 50 channel efficiency values, to form 50 2-tuples including the channel usage and the channel efficiency value. For a distribution status of the 50 2-tuples in the coordinate distribution diagram, refer to FIG. 4.

It should be noted that, in the following embodiment, an example in which the first dynamic parameter is the channel usage of the AP is used to specifically describe a method for determining, by the network quality monitoring apparatus, network quality of the local area network in which the AP is located.

Figure 5:
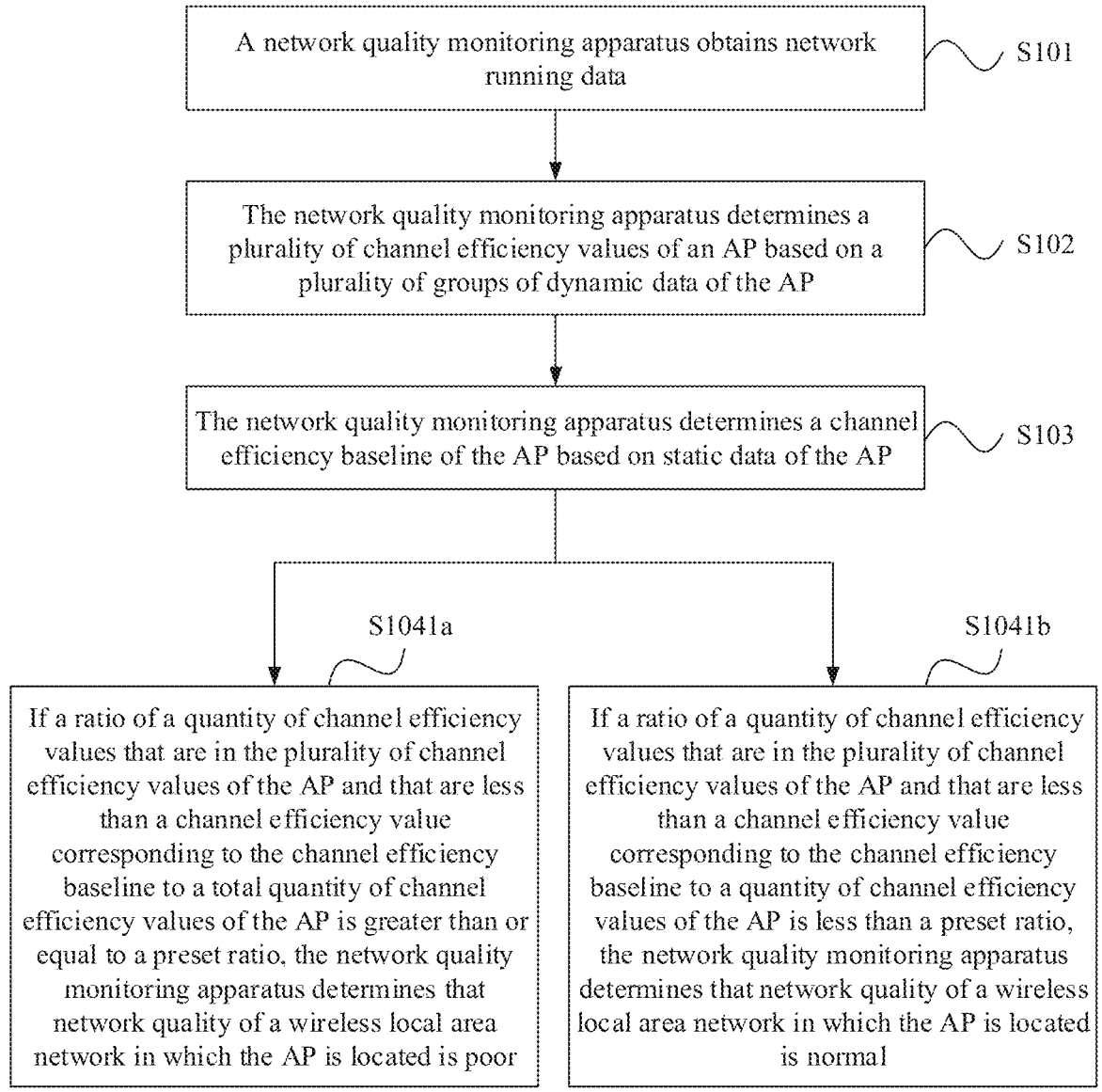
FIG. 5 is a schematic diagram 2 of a network quality monitoring method according to an embodiment of this application.

With reference to FIG. 2, as shown in FIG. 5, in an implementation, S104 may be implemented by using S1041a and S1041b.

S1041a: If a ratio of a quantity of channel efficiency values that are in the plurality of channel efficiency values of the AP and that are less than a channel efficiency value corresponding to the channel efficiency baseline to a total quantity of channel efficiency values of the AP is greater than or equal to a preset ratio, the network quality monitoring apparatus determines that network quality of the wireless local area network in which the AP is located is poor.

S1041b: If a ratio of a quantity of channel efficiency values that are in the plurality of channel efficiency values of the AP and that are less than a channel efficiency value corresponding to the channel efficiency baseline to a quantity of channel efficiency values of the AP is less than a preset ratio, the network quality monitoring apparatus determines that network quality of the wireless local area network in which the AP is located is normal.

In this embodiment of this application, with reference to FIG. 3, a vertical coordinate corresponding to a channel efficiency baseline is a reference value of a channel efficiency value. If a channel efficiency value in the plurality of channel efficiency values of the AP is less than a channel efficiency value corresponding to the channel efficiency baseline, it indicates that an amount of data transmitted per unit time in a valid data transmission time period is relatively small under a corresponding channel usage; or if a channel efficiency value in the plurality of channel efficiency values of the AP is greater than a channel efficiency value corresponding to the channel efficiency baseline, it indicates that an amount of data transmitted per unit time in a valid data transmission time period is relatively large under a corresponding channel usage.

It may be understood that the channel efficiency value may be used to measure network quality. In this embodiment of this application, if a ratio of a quantity of channel efficiency values that are in the plurality of channel efficiency values of the AP and that are less than a channel efficiency value corresponding to the channel efficiency baseline is greater than or equal to a preset ratio, it indicates that a data transmission effect is relatively poor, and the network quality monitoring apparatus determines that network quality of the wireless local area network in which the AP is located is poor. If a ratio of a quantity of channel efficiency values that are in the plurality of channel efficiency values of the AP and that are less than a channel efficiency value corresponding to the channel efficiency baseline is less than a preset ratio, it indicates that a data transmission effect is relatively good, and the network quality monitoring apparatus determines that network quality of the wireless local area network in which the AP is located is normal.

Figure 6:
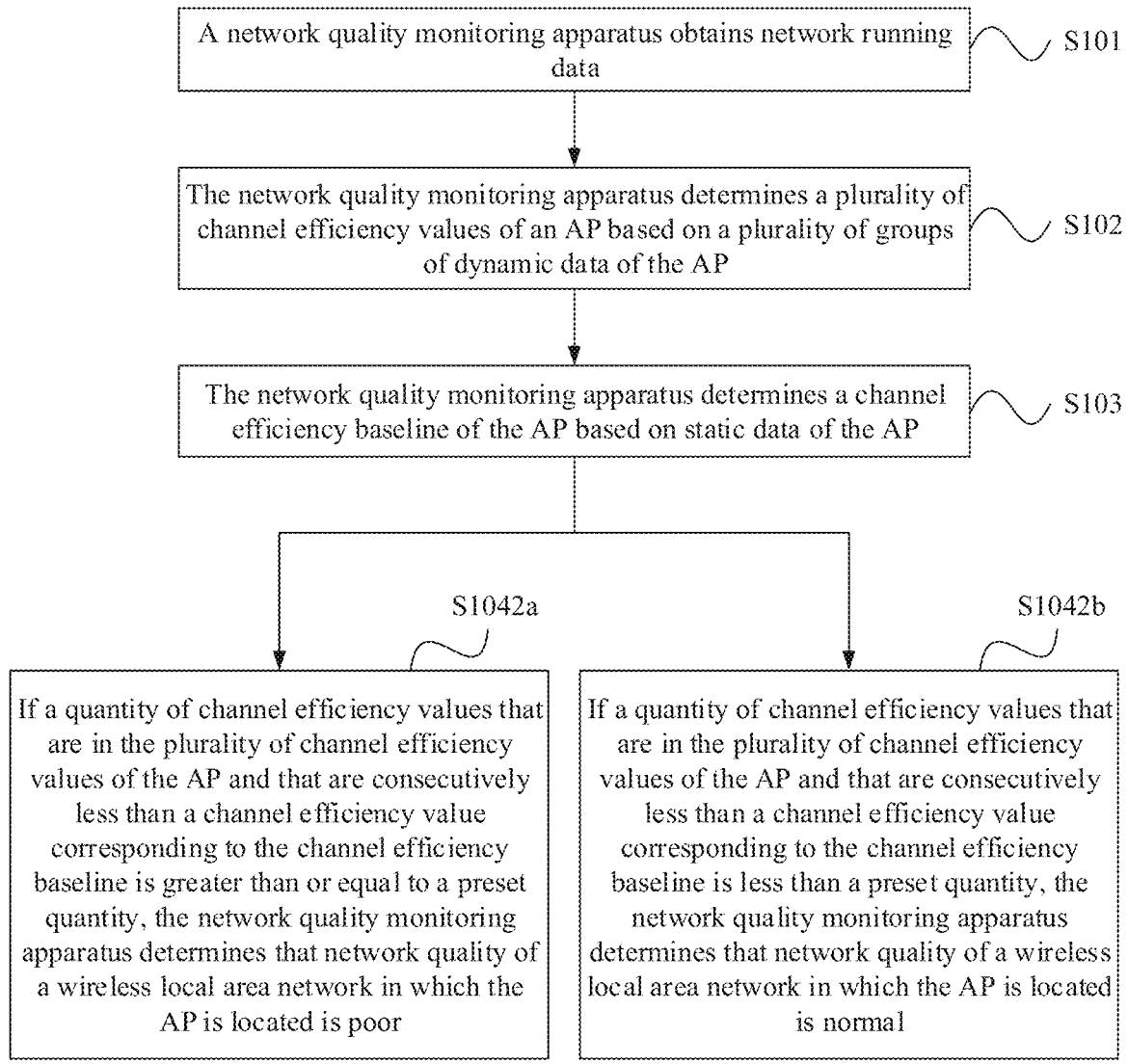
FIG. 6 is a schematic diagram 3 of a network quality monitoring method according to an embodiment of this application.

With reference to FIG. 2, as shown in FIG. 6, in another implementation, S104 may be implemented by using S1042a and S1042b.

S1042a: If a quantity of channel efficiency values that are in the plurality of channel efficiency values of the AP and that are consecutively less than a channel efficiency value corresponding to the channel efficiency baseline is greater than or equal to a preset quantity, the network quality monitoring apparatus determines that network quality of the wireless local area network in which the AP is located is poor.

S1042b: If a quantity of channel efficiency values that are in the plurality of channel efficiency values of the AP and that are consecutively less than a channel efficiency value corresponding to the channel efficiency baseline is less than a preset quantity, the network quality monitoring apparatus determines that network quality of the wireless local area network in which the AP is located is normal.

In this embodiment of this application, if a quantity of channel efficiency values that are in the plurality of channel efficiency values of the AP and that are consecutively less than a channel efficiency value corresponding to the channel efficiency baseline is greater than or equal to a preset quantity, it indicates that a data transmission effect is relatively poor, and the network quality monitoring apparatus determines that network quality of the wireless local area network in which the AP is located is poor. If a quantity of channel efficiency values that are in the plurality of channel efficiency values of the AP and that are consecutively less than a channel efficiency value corresponding to the channel efficiency baseline is less than a preset quantity, it indicates that a data transmission effect is relatively good, and the network quality monitoring apparatus determines that network quality of the wireless local area network in which the AP is located is normal.

Figure 7:
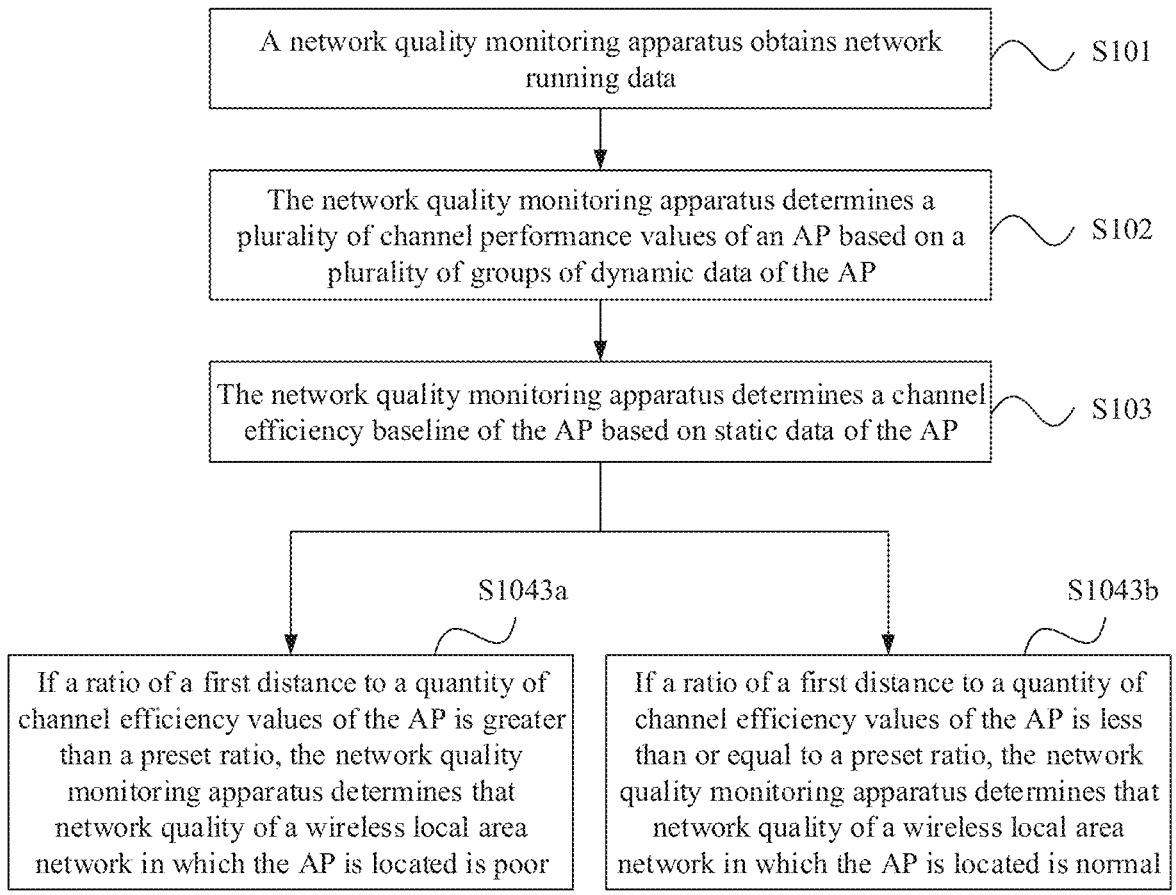
FIG. 7 is a schematic diagram 4 of a network quality monitoring method according to an embodiment of this application.

With reference to FIG. 2, as shown in FIG. 7, in still another implementation, S104 may be implemented by using S1043a and S1043a.

S1043a: If a ratio of a first distance to a quantity of channel efficiency values of the AP is greater than a preset ratio, the network quality monitoring apparatus determines that network quality of the wireless local area network in which the AP is located is poor.

The first distance is a sum of distances between a channel efficiency value corresponding to the channel efficiency baseline and channel efficiency values that are in the plurality of channel efficiency values of the AP and that are less than the channel efficiency value corresponding to the channel efficiency baseline.

S1043b: If a ratio of a first distance to a quantity of channel efficiency values of the AP is less than or equal to a preset ratio, the network quality monitoring apparatus determines that network quality of the wireless local area network in which the AP is located is normal.

In this embodiment of this application, the ratio of the first distance to the quantity of channel efficiency values of the AP may reflect a degree to which the channel efficiency value of the AP is less than a channel efficiency value corresponding to the channel efficiency baseline. If the ratio of the first distance to the quantity of channel efficiency values of the AP is greater than the preset ratio, it indicates that a data transmission effect is relatively poor, and the network quality monitoring apparatus determines that network quality of the wireless local area network in which the AP is located is poor. If the ratio of the first distance to the quantity of channel efficiency values of the AP is less than or equal to the preset ratio, it indicates that a data transmission effect is relatively good, and the network quality monitoring apparatus determines that network quality of the wireless local area network in which the AP is located is normal.

It may be understood that, in this embodiment of this application, when the channel efficiency baseline is a curve of a variation relationship between the reference value of the channel efficiency value of the AP and the throughput of the AP, or when the channel efficiency baseline is a curve of a variation relationship between the reference value of the channel efficiency value of the AP and the co-channel interference rate of the AP, for a method for determining, by the network quality monitoring apparatus, network quality of the local area network in which the AP is located, refer to S1041a and S1041b, S1042a and S1042b, or S1043a and S1043b. Details are not described herein again.

The foregoing mainly describes the solutions provided in the embodiments of this application from a perspective of the network quality monitoring apparatus (namely, the analyzer). It may be understood that, to implement the foregoing functions, the foregoing network quality monitoring apparatus includes corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, function modules of the network quality monitoring apparatus may be obtained according to the foregoing method embodiment. For example, the functional modules may be obtained through division corresponding to functions, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 8:
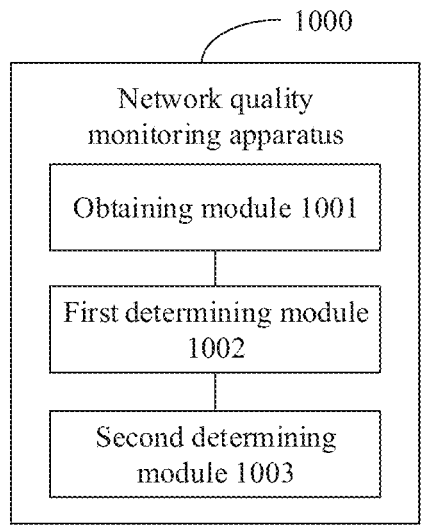
FIG. 8 is a schematic structural diagram 1 of a network quality monitoring apparatus according to an embodiment of this application.

FIG. 8 is a schematic diagram of a possible structure of a network quality monitoring apparatus 1000 in the foregoing embodiments. As shown in FIG. 8, the network quality monitoring apparatus 1000 may include an obtaining module 1001, a first determining module 1002, and a second determining module 1003. The obtaining module 1001 is configured to support the network quality monitoring apparatus 1000 in performing S101 in the foregoing method embodiment, the first determining module 1002 is configured to support the network quality monitoring apparatus 1000 in performing steps S102 and S103, and the second determining module 1003 is configured to support the network quality monitoring apparatus 1000 in performing S104 (including S1041a and S1041b, or S1042a and S1042b, or S1043a and S1043b) in the foregoing method embodiment. Related content of the steps in the foregoing method embodiments may be cited in function descriptions of corresponding function modules. Details are not described herein again.

Figure 9:
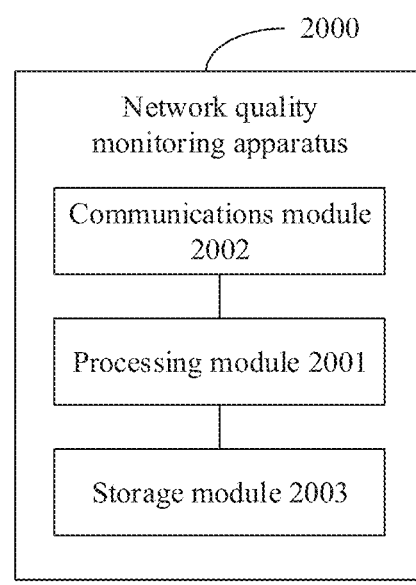
FIG. 9 is a schematic structural diagram 2 of a network quality monitoring apparatus according to an embodiment of this application.

When an integrated unit is used, FIG. 9 is a schematic diagram of a possible structure of a network quality monitoring apparatus 2000 in the foregoing embodiments. As shown in FIG. 9, the network quality monitoring apparatus 2000 may include a processing module 2001 and a communications module 2002. The processing module 2001 may be configured to control and manage an action of the network quality monitoring apparatus 2000. For example, the processing module 2001 may be configured to support the network quality monitoring apparatus 2000 in performing S101 to S104 in the foregoing method embodiment. The communications module 2002 may be configured to support communication between the network quality monitoring apparatus 2000 and another network entity. Optionally, as shown in FIG. 9, the network quality monitoring apparatus 2000 may further include a storage module 203, configured to store program code and data of the network quality monitoring apparatus 2000.

The processing module 2001 may be a processor or a controller (for example, may be the processor 11 in FIG. 1). The communications module 3002 may be a transceiver, a transceiver circuit, a communications interface, or the like (for example, may be the communications interface 13 in FIG. 1). For example, the communications module 2002 is a radio frequency transceiver circuit, and is configured to perform frequency up-mixing on a to-be-sent signal during sending, and perform frequency down-mixing on a received signal during receiving. The storage module 2003 may be a memory (for example, may be the memory 12 in FIG. 1).

When the processing module 2001 is a processor, the communications module 202 is a transceiver, and the storage module 2003 is a memory, the processor, the transceiver, and the memory may be connected by using a bus. The bus may be a peripheral component interconnect (PCI) bus, an extended industry standard architecture (EISA) bus, or the like. The bus may be classified into an address bus, a data bus, a control bus, and the like.

When signal reception is performed, the processing module 2001 and the communications module 2002 jointly implement signal reception. Specifically, the processing module 2001 controls or invokes the communications module 2002 to receive. The processing module 2001 is a decision maker and a controller of a receiving action, and the communications module 2002 is an executor of the receiving action.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, solid state drives (SSD)), or the like.

The foregoing descriptions about implementations allow a person skilled in the art to understand that, for the purpose of convenient and brief description, division of the foregoing function modules is taken as an example for illustration. In actual application, the foregoing functions are allocated to different modules and implemented accordingly, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on the objectives to be achieved of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that stores program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A network quality monitoring method, comprising:
obtaining, by a network quality monitoring apparatus, network running data, wherein the network running data comprises (1) static data and (2) dynamic data of an access point (AP), and the dynamic data comprises a plurality of groups of dynamic data corresponding to a plurality of sampling periods;
determining one channel efficiency value of the AP based on each of the plurality of groups of dynamic data of the AP, wherein the one channel efficiency value of the AP is a volume of data transmitted per unit time in a valid data transmission time period in one sampling period;
obtaining a plurality of channel efficiency values of the AP based on the one channel efficiency value for each of the plurality of groups of dynamic data of the AP;
determining a channel efficiency baseline of the AP based on the static data of the AP, wherein the channel efficiency baseline of the AP indicates a variation relationship between a reference value of a channel efficiency value of the AP and a first dynamic parameter, and the first dynamic parameter is part of the dynamic data; and
determining, based on the plurality of channel efficiency values of the AP and the channel efficiency baseline of the AP, network quality of a wireless local area network in which the AP is located.

2. The method according to claim 1, wherein
the dynamic data comprises a throughput of the AP, a channel usage of the AP, and a co-channel interference rate of the AP.

3. The method according to claim 1, wherein
the static data comprises a type of the AP, a network frequency band, and bandwidth.

4. The method according to claim 2, wherein the determining the one channel efficiency value of the AP based on each of the plurality of groups of dynamic data of the AP comprises:
determining, by the network quality monitoring apparatus, the channel efficiency value of the AP by using a formula AP_cp=AP_tp/(AP_cu−AP_cf), wherein AP_cp is the channel efficiency value of the AP, AP_tp represents the throughput of the AP, AP_cu represents the channel usage of the AP, and AP_cf represents the co-channel interference rate of the AP.

5. The method according to claim 3, wherein the determining the channel efficiency baseline of the AP comprises:
determining the channel efficiency baseline corresponding to the type of the AP, the network frequency band, and the bandwidth in a preconfigured channel efficiency baseline library as the channel efficiency baseline of the AP.

6. The method according to claim 2, wherein
the first dynamic parameter is the channel usage.

7. The method according to claim 6, wherein the determining based on the plurality of channel efficiency values of the AP and the channel efficiency baseline of the AP, the network quality of the wireless local area network in which the AP is located comprises:
responsive to a ratio of a quantity of channel efficiency values in the plurality of channel efficiency values of the AP and are less than a channel efficiency value corresponding to the channel efficiency baseline to a total quantity of channel efficiency values of the AP is greater than or equal to a preset ratio, determining that the network quality of the wireless local area network in which the AP is located is poor; or
responsive to the ratio of the quantity of channel efficiency values in the plurality of channel efficiency values of the AP and are less than a channel efficiency value corresponding to the channel efficiency baseline to the quantity of channel efficiency values of the AP is less than the preset ratio, determining that the network quality of the wireless local area network in which the AP is located is normal.

8. The method according to claim 6, wherein the determining based on the plurality of channel efficiency values of the AP and the channel efficiency baseline of the AP, the network quality of the wireless local area network in which the AP is located comprises:
responsive to a quantity of channel efficiency values in the plurality of channel efficiency values of the AP and are consecutively less than a channel efficiency value corresponding to the channel efficiency baseline is greater than or equal to a preset quantity, determining that the network quality of the wireless local area network in which the AP is located is poor; or
responsive to the quantity of channel efficiency values in the plurality of channel efficiency values of the AP and are consecutively less than the channel efficiency value corresponding to the channel efficiency baseline is less than the preset quantity, determining that the network quality of the wireless local area network in which the AP is located is normal.

9. The method according to claim 6, wherein the determining based on the plurality of channel efficiency values of the AP and the channel efficiency baseline of the AP, the network quality of the wireless local area network in which the AP is located comprises:
responsive to a ratio of a first distance to a quantity of channel efficiency values of the AP is greater than a preset ratio, determining that the network quality of the wireless local area network in which the AP is located is poor, wherein the first distance is a sum of distances between a channel efficiency value corresponding to the channel efficiency baseline and all channel efficiency values in the plurality of channel efficiency values of the AP and are less than the channel efficiency value corresponding to the channel efficiency baseline; or
responsive to the ratio of the first distance to the quantity of channel efficiency values of the AP is less than or equal to the preset ratio, determining that the network quality of the wireless local area network in which the AP is located is normal.

10. A network quality monitoring apparatus, comprising a processor and a memory coupled to the processor, wherein the memory comprising instructions, when executed, are configured to cause the network quality monitoring apparatus to:
obtain network running data, wherein the network running data comprises static data and dynamic data of an access point (AP), and the dynamic data comprises a plurality of groups of dynamic data corresponding to a plurality of sampling periods;
determine one channel efficiency value of the AP based on each of the plurality of groups of dynamic data, of the AP wherein the one channel efficiency value of the AP is a volume of data transmitted per unit time in a valid data transmission time period in one sampling period;
obtain a plurality of channel efficiency values of the AP based on the one channel efficiency value for each of the plurality of groups of dynamic data of the AP;
determine a channel efficiency baseline of the AP based on the static data, of the AP, wherein the channel efficiency baseline of the AP indicates a variation relationship between a reference value of a channel efficiency value of the AP and a first dynamic parameter, and the first dynamic parameter is part of the dynamic data; and
determine, based on the plurality of channel efficiency values of the AP and the channel efficiency baseline of the AP, network quality of a wireless local area network in which the AP is located.

11. The network quality monitoring apparatus according to claim 10, wherein
the dynamic data comprises a throughput of the AP, a channel usage of the AP, and a co-channel interference rate of the AP.

12. The network quality monitoring apparatus according to claim 10, wherein
the static data comprises a type of the AP, a network frequency band, and bandwidth.

13. The network quality monitoring apparatus according to claim 11, wherein the instructions when executed by the processor are further configured to cause the network quality monitoring apparatus to:
determine the channel efficiency value of the AP by using a formula AP_cp=AP_tp/(AP_cu−AP_cf), wherein AP_cp is the channel efficiency value of the AP, AP_tp represents the throughput of the AP, AP_cu represents the channel usage of the AP, and AP_cf represents the co-channel interference rate of the AP.

14. The network quality monitoring apparatus according to claim 12, wherein the instructions when executed by the processor are further configured to cause the network quality monitoring apparatus to:
determine the channel efficiency baseline corresponding to the type of the AP, the network frequency band, and the bandwidth in a preconfigured channel efficiency baseline library as the channel efficiency baseline of the AP.

15. The network quality monitoring apparatus according to claim 11, wherein
the first dynamic parameter is the channel usage.

16. The network quality monitoring apparatus according to claim 15, wherein the instructions when executed by the processor are further configured to cause the network quality monitoring apparatus to:
responsive to a ratio of a quantity of channel efficiency values in the plurality of channel efficiency values of the AP and are less than a channel efficiency value corresponding to the channel efficiency baseline to a total quantity of channel efficiency values of the AP is greater than or equal to a preset ratio, determine that the network quality of the wireless local area network in which the AP is located is poor; or responsive to the ratio of the quantity of channel efficiency values in the plurality of channel efficiency values of the AP and are less than a channel efficiency value corresponding to the channel efficiency baseline to the quantity of channel efficiency values of the AP is less than the preset ratio, determine that the network quality of the wireless local area network in which the AP is located is normal.

17. The network quality monitoring apparatus according to claim 15, wherein the instructions when executed by the processor are further configured to cause the network quality monitoring apparatus to:
responsive to a quantity of channel efficiency values in the plurality of channel efficiency values of the AP and are consecutively less than a channel efficiency value corresponding to the channel efficiency baseline is greater than or equal to a preset quantity, determine that the network quality of the wireless local area network in which the AP is located is poor; or responsive to the quantity of channel efficiency values in the plurality of channel efficiency values of the AP and are consecutively less than the channel efficiency value corresponding to the channel efficiency baseline is less than the preset quantity, determine that the network quality of the wireless local area network in which the AP is located is normal.

18. The network quality monitoring apparatus according to claim 15, wherein the instructions when executed by the processor are further configured to cause the network quality monitoring apparatus to:
responsive to a ratio of a first distance to a quantity of channel efficiency values of the AP is greater than a preset ratio, determine that the network quality of the wireless local area network in which the AP is located is poor; or responsive to the ratio of the first distance to the quantity of channel efficiency values of the AP is less than or equal to the preset ratio, determine that the network quality of the wireless local area network in which the AP is located is normal, wherein the first distance is a sum of distances between a channel efficiency value corresponding to the channel efficiency baseline and all channel efficiency values in the plurality of channel efficiency values of the AP and are less than the channel efficiency value corresponding to the channel efficiency baseline.

19. A non-transitory computer-readable storage medium, wherein the computer-readable storage medium comprises a computer instruction, and when the computer instruction is run on a computer, a network quality monitoring apparatus is enabled to perform:
obtain network running data, wherein the network running data comprises static data and dynamic data of an access point (AP), and the dynamic data comprises a plurality of groups of dynamic data corresponding to a plurality of sampling periods;
determine one channel efficiency value of the AP based on each of the plurality of groups of dynamic data, of the AP wherein the one channel efficiency value of the AP is a volume of data transmitted per unit time in a valid data transmission time period in one sampling period;
obtain a plurality of channel efficiency values of the AP based on the one channel efficiency value for each of the plurality of groups of dynamic data of the AP;
determine a channel efficiency baseline of the AP based on the static data, of the AP, wherein the channel efficiency baseline of the AP indicates a variation relationship between a reference value of a channel efficiency value of the AP and a first dynamic parameter, and the first dynamic parameter is part of the dynamic data; and
determine, based on the plurality of channel efficiency values of the AP and the channel efficiency baseline of the AP, network quality of a wireless local area network in which the AP is located.

20. The non-transitory computer-readable storage medium according to claim 19, wherein
the dynamic data comprises a throughput of the AP, a channel usage of the AP, and a co-channel interference rate of the AP.

* * * * *

UNITED STATES PATENT AND TRADEMARK OFFICE
CERTIFICATE OF CORRECTION

PATENT NO. : 11,800,386 B2
APPLICATION NO. : 17/325933
DATED : October 24, 2023
INVENTOR(S) : Jun Wu It is certified that error appears in the above-identified patent and that said Letters Patent is hereby corrected as shown below:

In the Specification

Column 12, Line 41-55 should be replaced with:

In the formula (1), $\frac{tx\_bytes + rx\_bytes}{pcu\_cycle} = AP\_tp$, and *AP_tp* represents the throughput of the AP; and $\frac{rx\_busy - rx\_inf}{pcu\_cycle} = AP\_cu - AP\_cf$, *AP_cu* represents the channel usage of the AP, and *AP_cf* represents the co-channel interference rate of the AP.

Signed and Sealed this
Twelfth Day of December, 2023

Katherine Kelly Vidal
*Director of the United States Patent and Trademark Office*